(12) United States Patent
Teng

(10) Patent No.: US 6,168,036 B1
(45) Date of Patent: Jan. 2, 2001

(54) CORKSCREW-FREE BOTTLE STOPPER

(76) Inventor: Hsi-Hsiung Teng, No. 53, An Le Rd., Ling Ya Dist., Kaohsiung (TW)

( * ) Notice: Under 35 U.S.C. 154(b), the term of this patent shall be extended for 0 days.

(21) Appl. No.: 09/410,465

(22) Filed: Oct. 1, 1999

(51) Int. Cl.[7] .................................................. B65D 39/00
(52) U.S. Cl. .......................... 215/296; 215/355; 215/358; 215/361; 215/364
(58) Field of Search .................................... 215/296, 364, 215/359, 358, 355, 361; 81/3.07, 3.41

(56) References Cited

U.S. PATENT DOCUMENTS

| | | | |
|---|---|---|---|
| Re. 1,576 | * 11/1863 | Shaw | 215/361 |
| 102,685 | * 5/1870 | Ladd et al. | 215/361 |
| 869,700 | * 10/1907 | Fraser | 215/361 |
| 1,138,764 | * 5/1915 | Kline | 215/358 |
| 1,203,349 | * 10/1916 | Johns | 215/364 X |
| 1,455,978 | * 5/1923 | Wentz | 215/296 |
| 1,469,487 | * 10/1923 | Schedler | 215/364 X |
| 2,046,224 | * 6/1936 | Vanderhoof | 215/296 |
| 2,095,272 | * 10/1937 | Vanderhoof | 215/296 |
| 2,946,491 | * 7/1960 | Bramming | 215/364 X |
| 3,135,410 | * 6/1964 | Federighi | 215/296 X |
| 3,750,822 | * 8/1973 | Dubach | 215/361 |
| 4,394,921 | * 7/1983 | Miskinis | 215/296 |
| 4,621,743 | * 11/1986 | DiRegolo et al. | 215/361 X |
| 4,889,251 | * 12/1989 | Hojnoski | 215/296 |
| 5,109,997 | * 5/1992 | Phillips | 215/364 X |
| 5,636,757 | * 6/1997 | Porvaznik | 215/296 X |
| 5,722,548 | * 3/1998 | Hojnoski | 215/296 X |
| 5,779,085 | * 7/1998 | Havlinek et al. | 215/361 X |
| 5,944,057 | * 8/1999 | Pierce | 215/358 |

FOREIGN PATENT DOCUMENTS

| | | | |
|---|---|---|---|
| 2414667 | * 11/1929 | (DE) | 215/296 |
| 269253 | * 11/1929 | (IT) | 215/358 |

* cited by examiner

Primary Examiner—Stephen K. Cronin
Assistant Examiner—Robin A. Hylton
(74) Attorney, Agent, or Firm—Kolisch Hartwell Dickinson McCormack & Heuser

(57) ABSTRACT

A convenient stopper for a bottle including a plug slidably retained in a cylinder by a connecting pin. The cylinder is sized to be received in an opening of the bottle. In a contracted mode of the stopper, the plug is disposed at the top of the connecting pin and away from the cylinder, whereby an outer wall of the cylinder contracts from the neck of the bottle, to allow easy removal from the bottle, without use of a corkscrew. In an expanded mode of the stopper, the plug is urged into the cylinder whereby the outer wall of the cylinder tightly seals the opening of the bottle. The stopper can be re-used to permit storage of remaining contents of the bottle to be consumed later.

7 Claims, 5 Drawing Sheets

CORKSCREW-FREE BOTTLE STOPPER

BACKGROUND OF THE INVENTION

1. Field of the Invention

The invention relates to a stopper, especially to a stopper for a bottle which can be removed without use of a corkscrew and can be used repeatedly.

2. Description of Related Art

As shown in FIG. 5, a wine bottle (30) has a mouth (31) and a cork (32). The cork (32) has an upper portion (321) and a lower portion (322).

To remove the cork (32) of the wine bottle (30) needs a corkscrew. However, on many occasions, there is no such tool at hand, and it will then be extremely difficult to remove the cork (32).

Additionally, when the conventional cylindrical cork (32) is removed from the mouth (31) of the bottle (30), it will swell and be very difficult to insert into the mouth (31) again as originally air tight. In such a situation the wine will have to be consumed fairly quickly, or be transferred to another container, or replace it with other caps.

SUMMARY OF THE INVENTION

One objective of the invention is to provide a stopper for a bottle which does not require use of a corkscrew in its extraction from the bottle.

Another objective of the invention is to provide a stopper for a bottle which can be used repeatedly.

Other objects, advantages and novel features of the invention will become more apparent from the following detailed description when taken in conjunction with the accompanying drawings.

DETAILED DESCRIPTION OF THE PREFFERED EMBODIMENT

Figure 1:
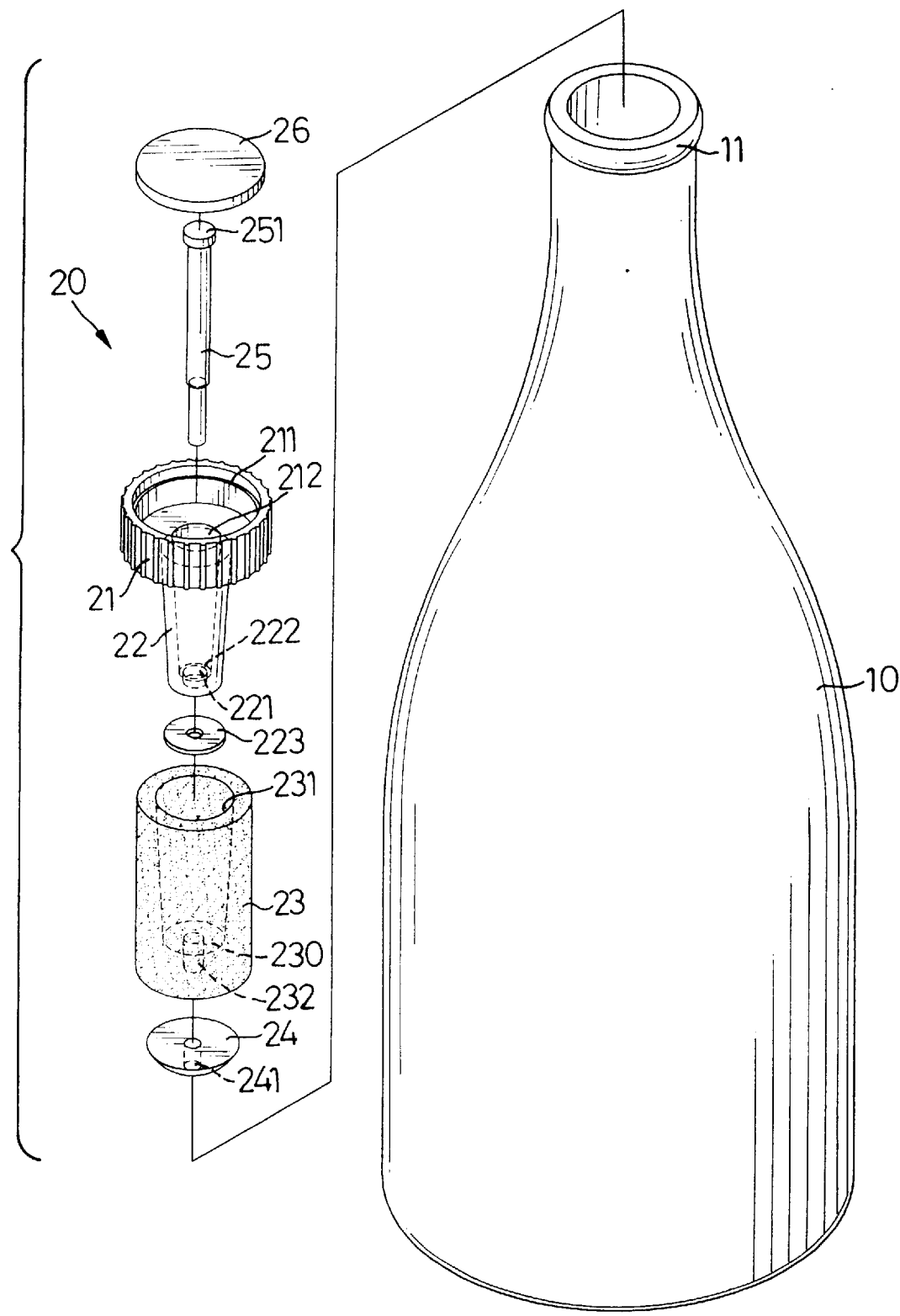
FIG. 1 is an exploded top perspective view of the invention.
Figure 2:
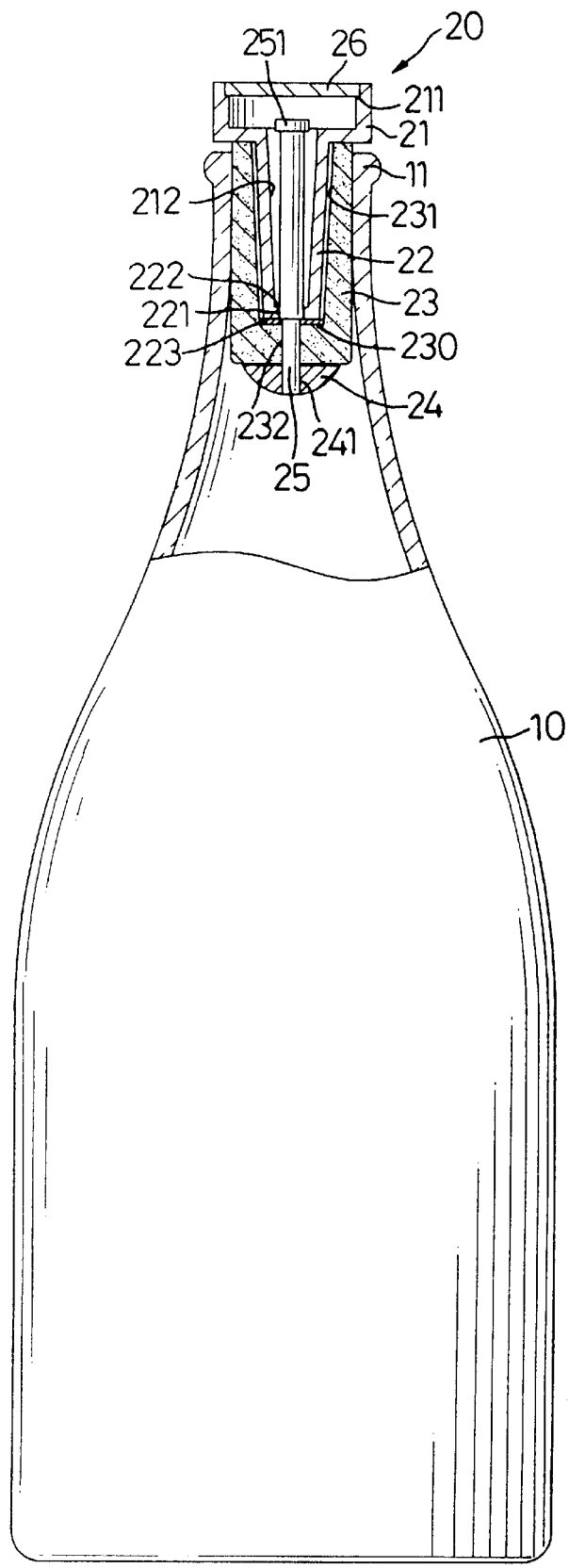
FIG. 2 is a cross-sectional side view of the invention when the stopper is inserted into the mouth of a bottle.

Referring to FIGS. 1 and 2, a stopper (20) for an opening (11) of a bottle (10) comprises a plug (21), a cylinder (23), a retainer (24), a pin (25) and a disc (26). The plug (21) is hollow and substantially T-shaped in side cross-section, with a head and a taper neck (22) integrally extending downward from the head. A circumferential wall of the head has an outer diameter similar to an outer diameter of the neck of a bottle (10). The circumferential wall defines a top opening leading into a top cavity. An inner flange (222) defines a bottom opening (221) in the neck (22) leading upward to a taper cavity (212) which is in communication with the top cavity. The taper cavity (212) has a small bottom diameter and a large top diameter.

The disc (26) is securely received on a circumferential step (211) defined in an inner face of the circumferential wall.

The cylinder (23) is hollow and has an outer diameter dimensioned to fit in the opening (11) of the bottle (10). The cylinder (23) defines an open top end in communication with a large recess (231) thereunder. The recess (231) is taper in side cross-sectional view with a large upper diameter and a small lower diameter, and is configured to mate with the taper neck (22). A step defining the bottom of the recess (231) further defines a small bore (232) therethrough which is in communication with the recess (231) and the under face of the cylinder (23). The pin (25) includes a rod and an integral cap (251) formed at the top of the rod. The cap (251) has a diameter larger than the bottom opening (221) of the neck (22) of the plug (21). The rod is sized to extend through the bottom opening (221) of the neck (22), the recess (231) and the small bore (232) of the cylinder (23), and into a hole (241) defined in the retainer (24). The retainer (24) has an outer diameter slightly smaller than the outer diameter of the cylinder (23).

In assembly, the pin (25) is received in the taper cavity (212) of the plug (21), and extends sequentially through the bottom opening (221) of the neck (22), the recess (231) and small bore (232) of the cylinder (23), whereafter a protruding tip of the pin (25) is securely received in the hole (241) of the retainer (24) which is secured to the under face of the cylinder (23). The pin (25) has a length dimensioned to allow the plug (21) to rise out of the cylinder (23) but not knock out the disc (26) fitted on the step (211) when the plug (21) is in its lowermost position in the cylinder (23). In its uppermost position, the plug (21) is clear of the cylinder (23) and the outer wall of the neck (22) does not contact the inner wall of the cylinder (23), whereby the stopper (20) is in a contracted mode. In the lowermost position of the plug (21), the outer wall of the neck (22) urges against the inner wall of the cylinder (23) and pushes it outward, whereby the stopper (20) is in its expanded mode.

Still referring to FIG. 2, in use, the plug (21) is pushed into the cavity (231) of the cylinder (23), whereafter, due to the design of the plug (21), the stopper (20) can be eased into the opening (11) of the bottle (10).

Figure 3:
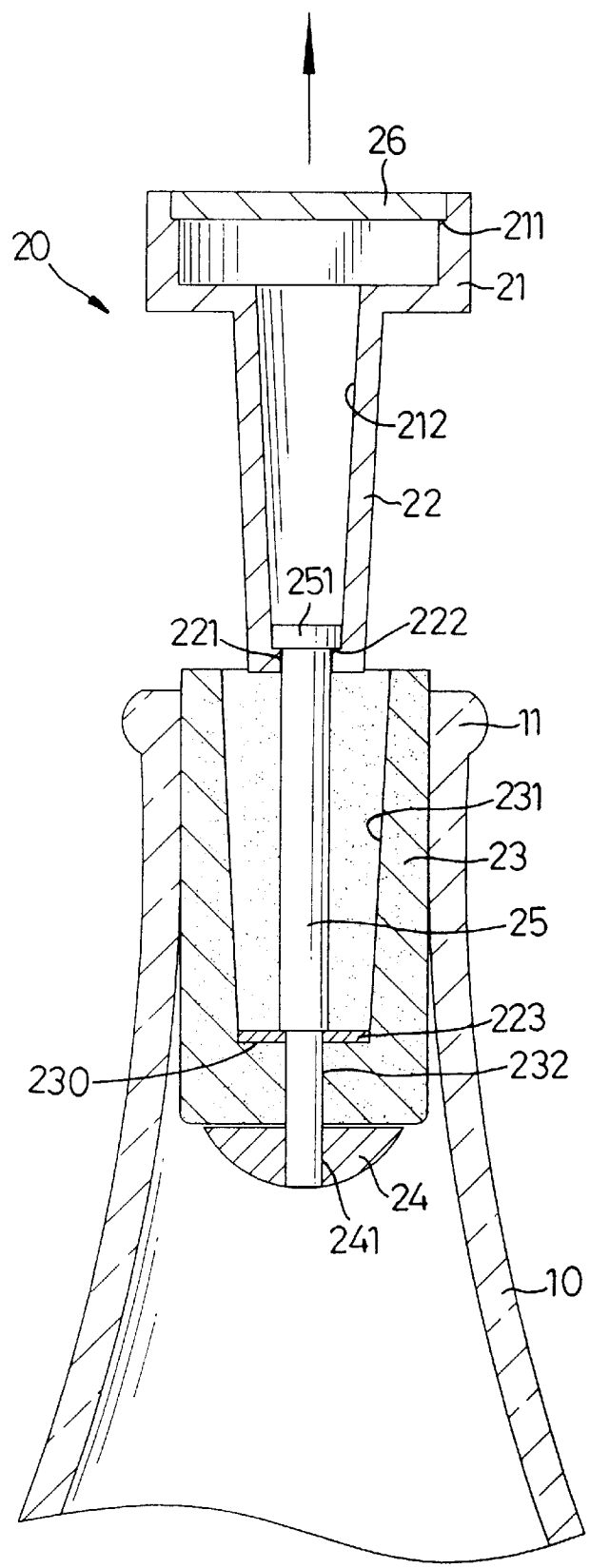
FIG. 3 is an enlarged cross-sectional side view of the stopper partly removed from the bottle.
Figure 4:
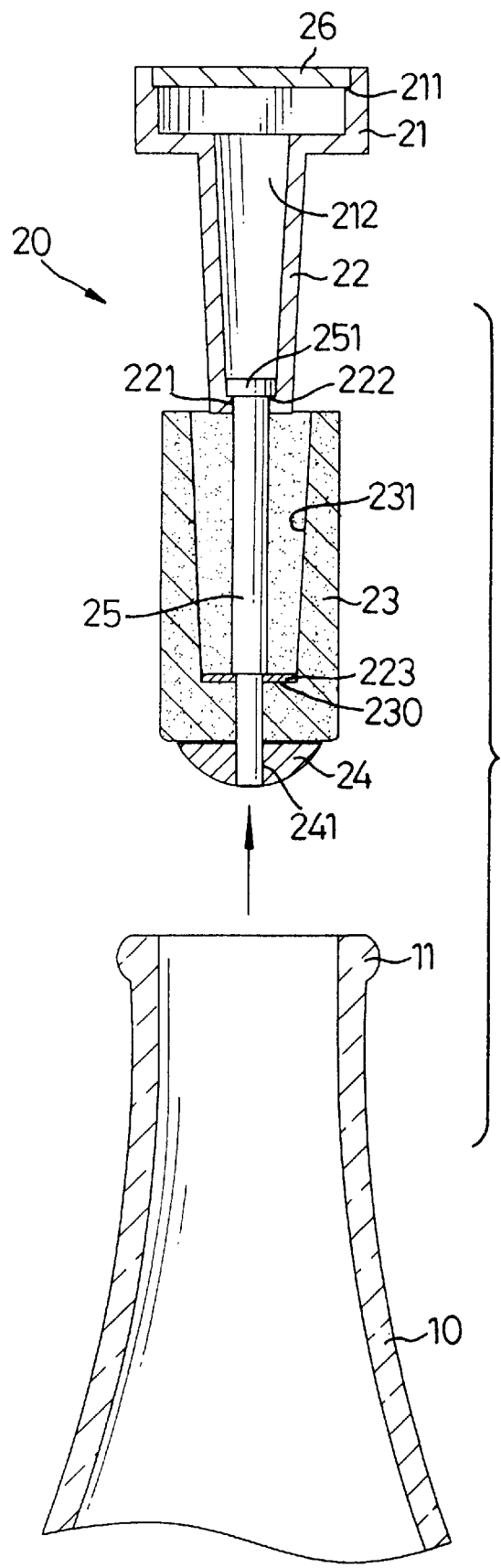
FIG. 4 is an enlarged cross-sectional side view of the stopper completely removed from the bottle.
Figure 5:
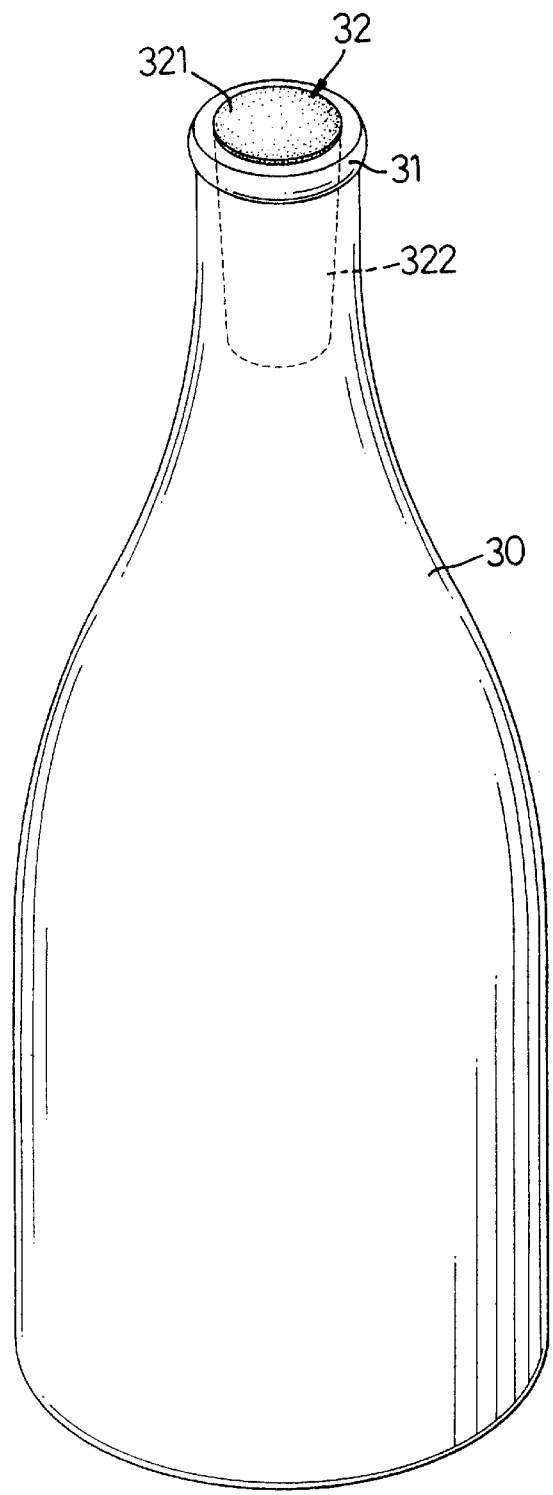
FIG. 5 is a top perspective view of a conventional stopper.

Referring to FIGS. 3 and 4, to remove the stopper (20) from the opening (11) of the bottle (10), the head of the plug (21) is pulled away from the cylinder (23) until the cap (251) of the pin (25) abuts on the inner flange (222) whereafter further pulling urges the retainer (24) against the underface of the cylinder (23) and the stopper (20) is ultimately extracted. A ring gasket (223) is optionally fitted between the bottom opening of the plug (21) and the step of the neck (230).

The head of the plug (21) may optionally have ridges around the circumferential wall thereof, to increase easy opening.

The cylinder (23) may be made of cork or any material commonly employed in the manufacture of stoppers.

Although the stopper of the present invention is directed toward a wine bottle, it will be equally effective on any bottle and its contents.

From the above description, it is noted that the invention has the following advantages:

1. the stopper can be removed without using a corkscrew;
2. the stopper can be used repeatedly which makes the preservation of the remaining contents in the bottle easily achieved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stopper for a bottle, comprising:

expandable means for engagement in the neck of a bottle;

a device receivable in the expandable means; and a link movably linking the device to the expandable means from a first mode to a second mode and vice-versa;

wherein the expandable means is a cylinder defining a large recess which is tapered, and further defining a small bore below the large recess and in communication therewith;

wherein the device is a plug comprising a head, a tapered neck integrally extending downward from the head, a top cavity defined in the head and a tapered cavity defined in the tapered neck and in communication with the top cavity, whereby the tapered neck is received in the large recess of the cylinder to press thereagainst when the stopper is in an expanded mode; and wherein the first mode of the stopper occurs when the stopper is contracted and wherein the second mode of the stopper occurs when the stopper is expanded.

2. The stopper as claimed in claim 1, wherein the linking means comprises a pin with a top cap and a rod and a retainer, whereby the pin extends through the plug and the cylinder to fixedly engage with the retainer, such that the plug may retainedly rise to an uppermost position whereby the stopper is in the first mode and descends to a lowermost position whereby the stopper is in the second mode.

3. The stopper as claimed in claim 2, wherein the top cap of the pin has a diameter larger than the bottom opening of the tapered neck of the plug.

4. The stopper as claimed in claim 1, wherein the head of the plug defines an inner circumferential step to securely receive thereon a disc.

5. The stopper as claimed in claim 1, wherein a ring gasket is received between the bottom of the tagered neck and a step defining the bottom of the recess of the cylinder.

6. The stopper as claimed in claim 1, wherein the expandable means is made of cork.

7. The stopper as claimed in claim 1, wherein the head has a plurality of ridges formed on an outside circumference.

* * * * *